United States Patent
Knapp et al.

(10) Patent No.: US 6,293,389 B1
(45) Date of Patent: Sep. 25, 2001

(54) EN MASSE BULK MATERIAL CONVEYOR APPARATUS

(75) Inventors: Dorcel Warren Knapp, Laurel, MS (US); William L. McLean, No. 25 Northgate Dr., Laurel, MS (US) 39440

(73) Assignee: William L. McLean, Laurel, MS (US)

( * ) Notice: Subject to any disclaimer, the term of this patent is extended or adjusted under 35 U.S.C. 154(b) by 0 days.

(21) Appl. No.: 09/499,769

(22) Filed: Feb. 8, 2000

(51) Int. Cl.[7] .................................................. B65G 15/08
(52) U.S. Cl. ........................ 198/823; 198/836.1; 198/841
(58) Field of Search ............................... 198/688.1, 716, 198/717, 719, 721, 818, 819, 823, 820, 821, 860.3, 841, 837, 840, 860.5, 525, 836.1

(56) References Cited

U.S. PATENT DOCUMENTS

| | | | |
|---|---|---|---|
| 3,292,773 | * 12/1966 | Keehart et al. | 198/204 |
| 4,215,776 | * 8/1980 | Esler | 198/823 |
| 4,359,156 | * 11/1982 | Austin | 198/841 |
| 4,475,648 | * 10/1984 | Weeks | 198/830 |
| 4,789,056 | * 12/1988 | Bourbeau | 198/823 |
| 5,007,528 | * 4/1991 | Hideharu | 198/823 |
| 5,154,280 | * 10/1992 | Mott | 198/525 |
| 5,799,780 | * 9/1998 | Steeb, Jr. et al. | 198/823 |
| 5,915,527 | * 6/1999 | Nakamura | 198/861.1 |
| 5,927,478 | * 7/1999 | Archer | 198/823 |
| 5,947,266 | * 9/1999 | Rionde | 198/860.3 |

* cited by examiner

Primary Examiner—Christopher P. Schwartz
Assistant Examiner—Benjamin A. Pezzlo
(74) Attorney, Agent, or Firm—Thomas S. Baker, Jr.

(57) ABSTRACT

The en masse bulk material conveyor apparatus of the present invention is essentially comprised of a length of formed trough having a generally U-shaped cross-section configuration with a substantial horizontal center section, a flexible endless bulk material-moving conveyor belt frictionally supported by the formed trough, a conventional drive roll, idle roll, belt tension roll, and drive motor combination co-operating with the endless material-moving belt, and a bulk material enclosure positioned above and in spaced-apart relation to the endless belt. Bulk material loading chute and discharge chute features may optionally be combined with the conveyor apparatus.

10 Claims, 4 Drawing Sheets

EN MASSE BULK MATERIAL CONVEYOR APPARATUS

CROSS-REFERENCES

None

FIELD OF THE INVENTION

This invention pertains generally to bulk material handling equipment, and particularly involves a so-called "en masse" type of bulk material conveyor construction that has a significantly increased rate of bulk material movement capability per unit of movement input power in comparison to known en masse bulk material conveyors.

BACKGROUND OF THE INVENTION

Bulk material conveyor apparatus constructions utilizing flexible endless material-moving belts, formed U-shaped troughs that frictionally support conveyor system endless belts, and drive, idle, and tensioning roll endless belt drives, in combination, are well known. Also, en masse bulk material conveyor apparatus construction utilizing spaced frames or skeletonized flights attached to an endless cable or chain are well known. An en masse conveyor is a machine in which the material moves within a stationary duct as a continuous core as contrasted with the manner of movement of material conveyed by a screw or flight conveyor, bucket elevator or belt conveyor. Achieving "en masse" movement depends upon the material moved having a higher internal friction factor than the materials friction factor on the contact surface on the stationary trough. Conveyors based on this principal have the advantage of conveying large capacity relative to their cross section. Traditional en masse conveyors utilize chain and flights to effect en masse movement but are limited as to length and speed by the strength of the chain. Acceptable chain speed and ultimate strength are far less than that of conveyor belting.

Additionally, the prior art bulk material conveyor apparatus arrangements typically have bulk material quantity rate of material-movement limitations as related to movement-power inputs, and also frequently have endless belt speed and length limitations relating to movement-power inputs. Such limitations are keyed to the internal friction and angle of repose factors of the particular bulk material being conveyed.

I have discovered an improved en masse bulk material conveyor apparatus construction which in substantial degree overcomes the limitations associated with the prior art conveyor apparatus. The improved bulk material conveyor apparatus of the present invention, in addition to being capable of moving larger quantities of a particular bulk material with reduced input movement-power, permits bulk material conveyor apparatus installations of greater lengths and with greater material-moving belt speeds.

Other objects and advantages of the present invention will become apparent from a consideration of the descriptions, drawings, and claims which follow.

SUMMARY OF THE INVENTION

The en masse bulk material conveyor apparatus of the present invention is essentially comprised of a length of formed trough having a generally U-shaped cross-section configuration with a substantially horizontal center section, a flexible endless material-moving belt frictionally supported by the formed trough, a conventional drive roller, idle roller, tail roller, and drive motor combination co-operating with the endless material-moving belt, and a bulk material enclosure positioned above and in spaced-apart relation to the endless belt. Bulk material loading chute and discharge chute features may optionally be combined with the conveyor apparatus.

Figure 1:
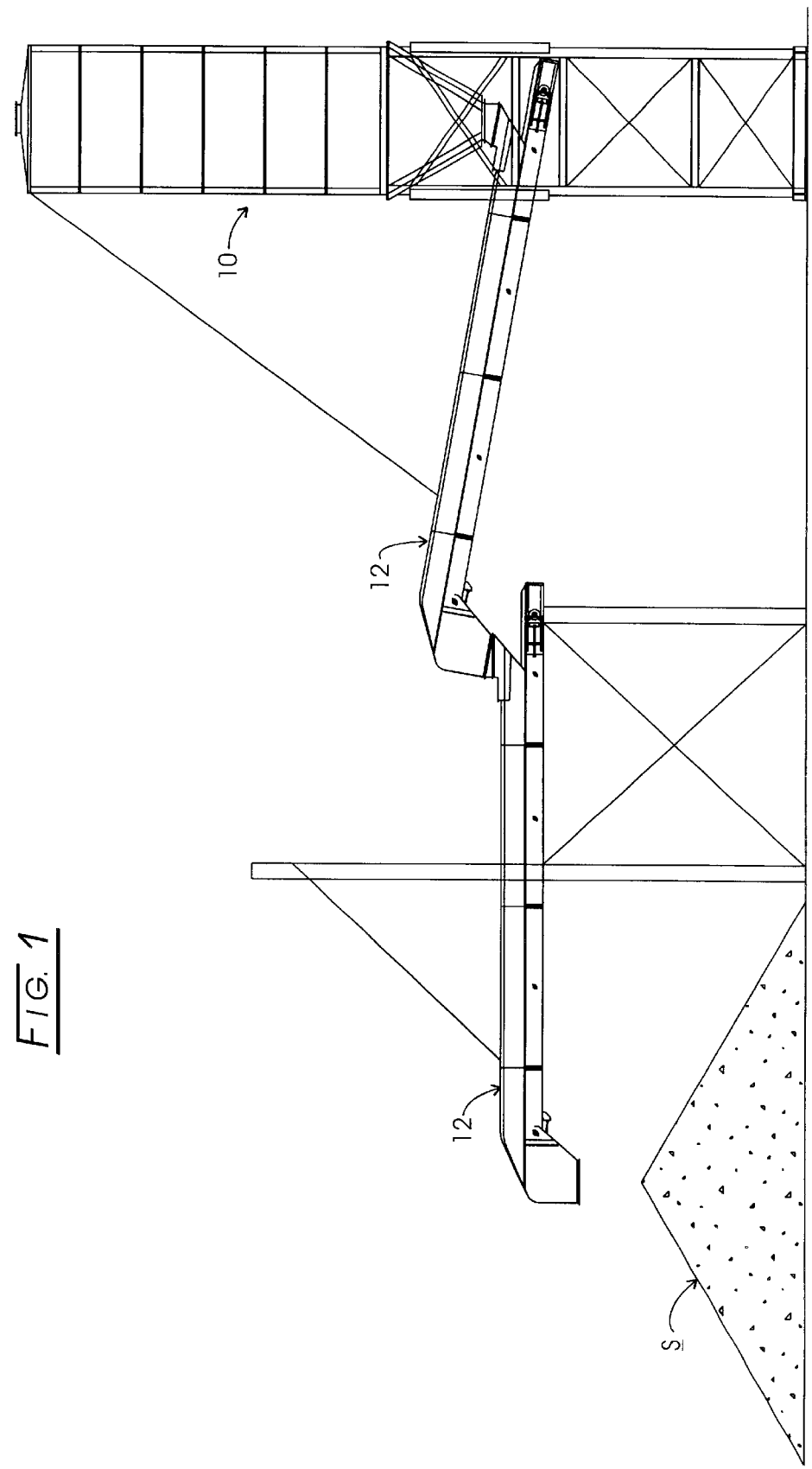
FIG. 1 is a side elevation view of a bulk material handling system which includes two section of en masse bulk material conveyor apparatus of the present invention.

DETAILED DESCRIPTION:

FIG. 1 schematically illustrates a bulk material handling installation that functions to move a particular bulk material from elevated storage bin or silo 10 to the site S using two sections of en masse bulk material conveyor apparatus 12 of the present invention. The right-most bulk material conveyor has an upward slope and generally because of that slope requires a larger power input to achieve a given rate of material transport than does the left-most conveyor apparatus 12. The source of power, typically electric power, for conveyor units 12 is conventional and is not shown in the drawings. Also, the bulk material handling installation of FIG. 1 is typically utilized to move bulk materials that are particulate or granular in nature, such as various grains, sands, stone aggregates, pulverized coals, and other free-flowing materials available and utilized in bulk.

Figure 2:
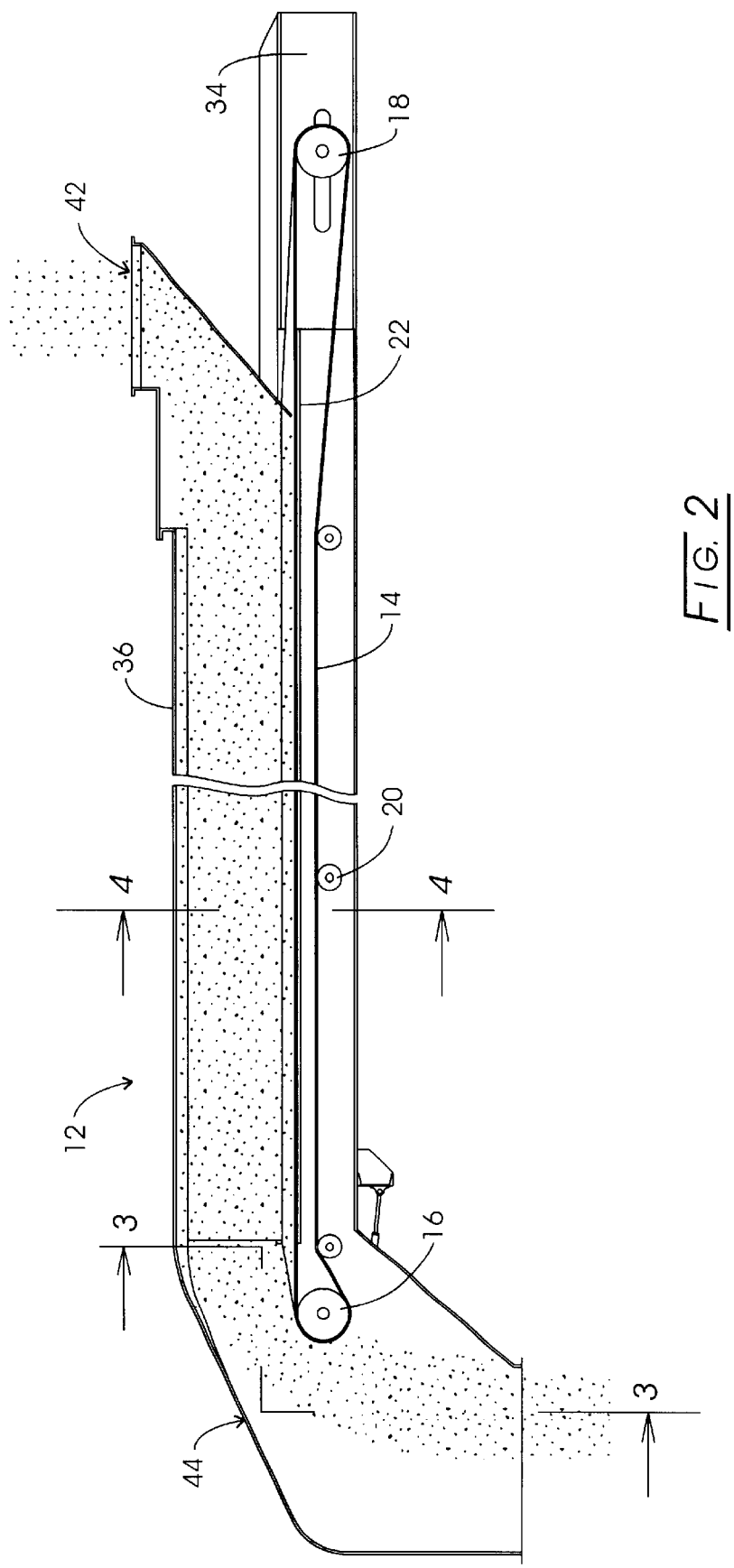
FIG. 2 is a longitudinal section view taken through a preferred embodiment of one of the conveyors of FIG. 1.
Figure 3:
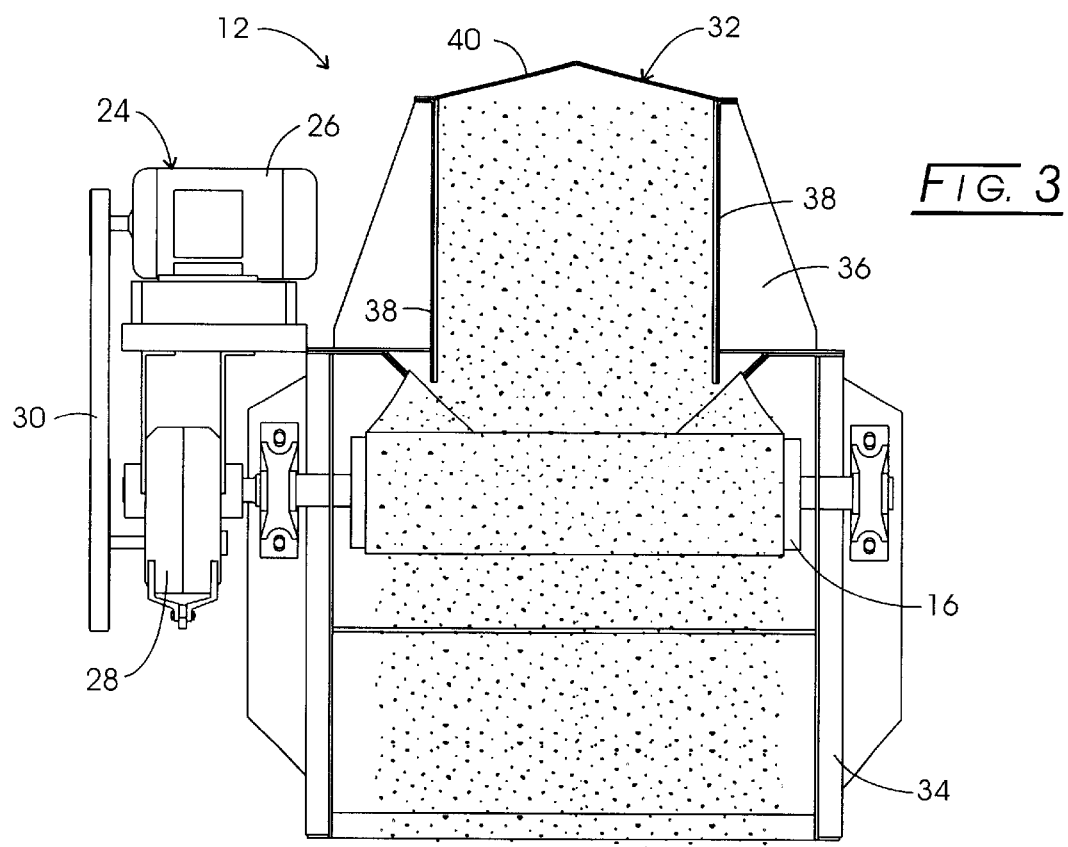
FIG. 3 is a cross-section view taken at line 3—3 of FIG. 2.

As shown in FIGS. 2 and 3, apparatus 12 is basically comprised of an endless belt 14, which co-operates with head roller 16, tail roller 18, and idle rollers 20, a formed trough 22 which supports belt 14, and a drive 24 (see FIG. 3) which is functionally connected to head roller 16. Drive 24 includes electric motor 26 and gear reducer unit 28 that is connected to head roller 16 and that is driven by electric motor 26 through transmission belt 30 and co-operating pulleys. Endless belt 14 typically has a flexible, woven or plied carcass with an adhered rubber top surface. Also, tail roller 18 may be additionally spring-urged away from head roller 16 to additionally function as a belt tensioner. Trough 22 is U-shaped and has a solid horizontal bottom section 23 and a pair of solid oppositedly angled sides 25, 27 affixed to opposite sides thereof. Idle rollers 20 only support the under-half or return run of belt 14 beneath trough 22. By supporting belt 14 with solid trough 22 as opposed to utilizing spaced rollers which is traditional, substantial power losses and material spillage caused by belt sagging and squeezing between rollers are avoided. No support rollers are mounted in trough 22. Thus, trough 22 fully supports belt 14. The upper or inner surface of formed trough 22 preferably is coated or lined with a friction-reducing material such as a film of Teflon™ or of ultra-high molecular weight polyethylene.

Apparatus components 14 through 22 are contained within a multi-part housing 32 which is comprised of a lower section 34 and an upper section 36. Enclosure lower section 34 houses rollers 16, 18, and 20 and the under-half of endless belt 14, and supports formed trough 22. Enclosure upper section 36 having side wall 38 is positioned above and supported by flanges 29 formed at the top edges of angled sides 25, 27 of formed trough 22. The side walls 38 function to increase the en masse payload of belt 14 substantially above the surcharge angle formed by the natural angle of repose (angle which the surface of a normal freely formed pile of material makes to the horizontal) for a given material. They accomplish this by directing the downward load forces of a material onto belt 14 and by ensuring that the internal frictional forces for a given material are sufficient to cause the material to move en masse. Because the side walls 38 are spaced inwardly of belt edge 15, they do not touch belt 14 and less power is required to drive the belt. Optionally, enclosure upper section 36 also may include a cover 40 which rests upon side walls 38 to enclose said enclosure upper section 36 and thereby protect the bulk material.

Figure 4:
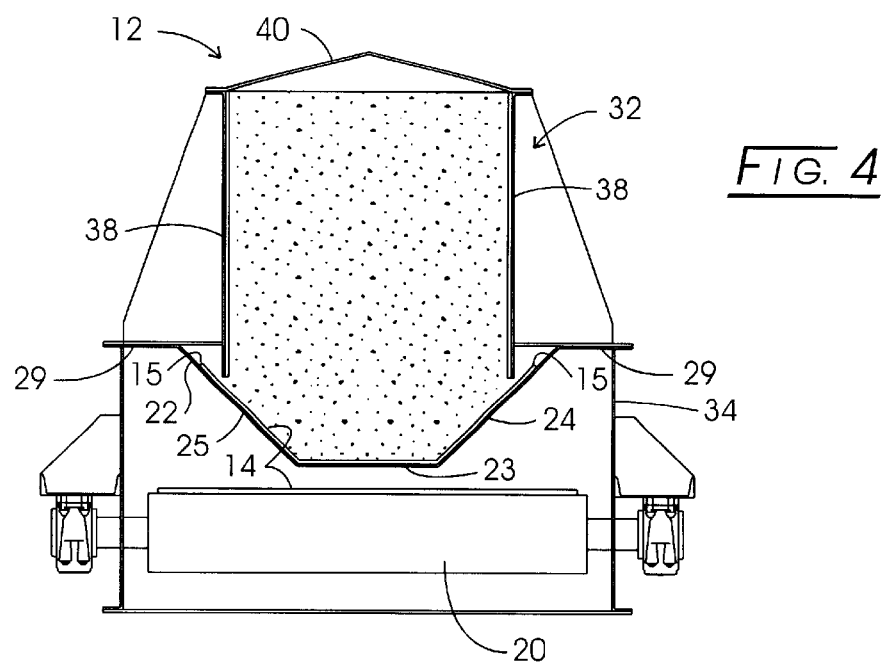
FIG. 4 is a cross-section view taken at line 4—4 of FIG. 2.
Figure 5:
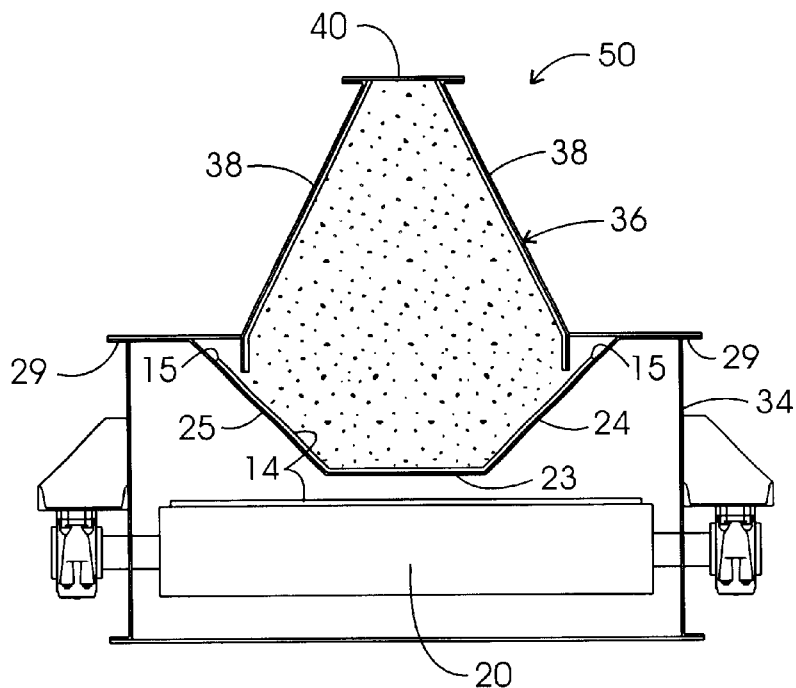
FIGS. 5 and 6 are similar to FIG. 4 but detail alternate embodiments of the invention superimposed bulk material enclosure.
Figure 6:
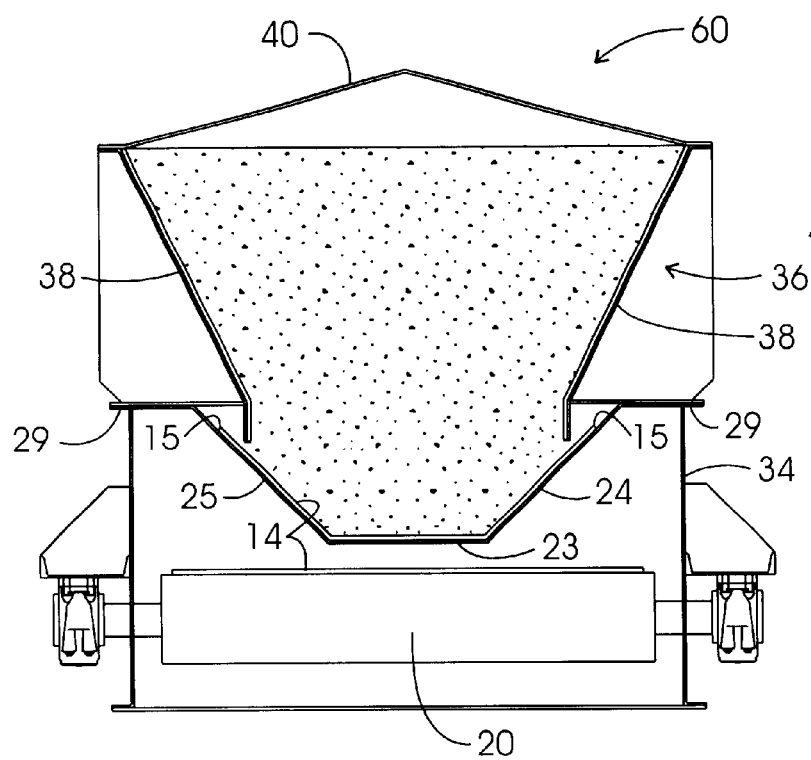

While FIGS. 3 and 4 illustrate upper section 36 of the preferred embodiment 12 of the present invention as having truly vertical sides, it is advantageous in some application instances, and basically depending upon the bulk density and angle of repose of the material being moved by apparatus 12, for conveyor assembly 12 to advantageously have an enclosure upper section 36 provided with sides 38 that are inclined either inwardly or outwardly relative to the apparatus vertical axis as shown in FIGS. 5 and 6, respectively. The sides 38 serve to increase the capacity of conveyor assembly 12 and to direct the weight of the material downwardly onto belt 14 for optimum belt loading. A dense bulk material such as sugar, for instance, would preferably utilize the inwardly sloping side walls 38 depicted in FIG. 5; a greatly less dense material, such as a talc powder for instance, may utilize the outwardly sloping enclosure upper section walls 38 of FIG. 6. In each of the alternate embodiments 50 and 60 of enclosure upper section 36, however, the lower edges of side walls 38 must be spaced apart from endless belt 14 and therefore also apart from the upwardly sloping sides of length of formed trough 22. The lower edges of side walls 38 also must be positioned inwardly of the outer edges 15 of endless belt 14.

Also, the conveyor apparatus of the present invention is preferably, but optionally, provided with loading chute 42 and/or discharge chute 44 which are attached to and made a part of enclosure sections 34 and 36.

In comparison to known bulk material-moving conveyor apparatus constructions, the present invention basically develops its improved capability by utilizing a trough to support the belt and by extending the apparatus payload to above the surcharge angle dictated by the natural angle of repose of the bulk material being transported. Advantages associated with the present invention include: (1) en masse free-flowing bulk material conveying without the use of state-of-the-art conveyor chains and conveyor flights; (2) greater conveyor lengths and greater material movement velocities for a given apparatus power input in comparison to chain-and-flight conveyors; (3) increased free-flowing bulk material payload capacities for given belt widths and belt velocities in comparison to state-of-the-art belt conveyors; (4) greater angles of inclination and belt loading than can be achieved with state-of-the-art belt conveyors; (5) less product damage that is typically caused by known belt conveyors, drag conveyors, and chain and flight en masse conveyors; and (6) lower input horsepower requirements than current en masse and drag conveyors having the same payload capacity or bulk material delivery rate.

Various changes may be made to the configurations, proportionate sizes, placements, and materials of construction of the invention components described herein without departing from the scope, meaning, or intent of the claims which follow.

I claim as my invention:

1. A conveyor apparatus construction for moving a free-flowing bulk material en masse, and comprising:
    an enclosure lower section having an open top;
    a length of formed trough supported by said enclosure lower section at the open top and having a cross-section provided with a horizontal intermediate section joined at each edge with an integral upwardly-sloping side wall;
    an endless flexible bulk material-moving conveyor belt in-part frictionally supported by and substantially conforming to said length of trough cross-section and in-part housed in space located between said length of formed trough and said enclosure lower section;
    conveyor apparatus head roller and tail roller means co-operating with said endless flexible bulk material-moving conveyor belt and being housed in space located between said length of formed trough and said enclosure lower section;
    motor means movably powering said endless flexible bulk material-moving conveyor belt through said conveyor apparatus head roller and tail roller means; and
    an enclosure upper section supported by said enclosure lower section at the open top and having opposed side walls extending upwardly along the length of said length of formed trough to thereby increase the volume of bulk conveyed material above the angle of repose of the material, said enclosure upper section side walls each having a lower edge which is positioned above and in spaced-apart relation to one of said length of formed trough integral upwardly-sloping side walls and spaced above and inwardly of the outer edge of said conveyor belt.

2. The invention defined by claim 1, and wherein said enclosure upper section side walls are oriented vertically with respect to said endless flexible bulk material-moving conveyor belt.

3. The invention defined by claim 1, and wherein said enclosure upper section side walls are oriented upwardly and inwardly with respect to said endless flexible bulk material-moving conveyor belt.

4. The invention defined by claim 1, and wherein said enclosure upper section side walls are oriented upwardly and outwardly with respect to said endless flexible bulk material-moving conveyor belt.

5. The invention defined by claim 1, further comprising a cover seated on said opposed side walls and cooperating with said side walls to enclose said enclosure upper section.

6. The invention defined by claim 1, wherein the upper surface of said formed trough is coated with a friction-reducing material.

7. The invention defined by claim 6, where said friction-reducing material is ultra high molecular weight polyethylene.

8. The invention defined by claim 6, where said friction-reducing material is Teflon™.

9. The invention defined by claim 1, wherein said horizontal intermediate section of said formed trough is substantially solid.

10. The invention defined by claim 1, wherein said upwardly-sloping side walls of said trough are substantially solid.

* * * * *